United States Patent [19]

McLain, Sr. et al.

[11] Patent Number: 4,652,988

[45] Date of Patent: Mar. 24, 1987

[54] PLUG-IN POWER MODULE FOR ELECTROSTATIC AIR CLEANER

[75] Inventors: Bruce H. McLain, Sr., Nashville; John P. Sallee, Murfreesboro, both of Tenn.

[73] Assignee: Trion, Inc., Sanford, N.C.

[21] Appl. No.: 719,896

[22] Filed: Apr. 4, 1985

[51] Int. Cl.[4] .............................................. H02M 1/00

[52] U.S. Cl. ...................................... 363/146; 55/139; 323/903

[58] Field of Search .................................... 363/18-19, 363/97, 146, 59-61; 323/903; 55/105, 139; 320/2

[56] References Cited

U.S. PATENT DOCUMENTS

| | | | |
|---|---|---|---|
| 3,255,399 | 6/1966 | Parks | 363/146 |
| 3,359,461 | 12/1967 | Schuler et al. | 363/146 |
| 3,928,793 | 12/1975 | Waltz | 363/19 |
| 4,007,024 | 2/1977 | Sallee et al. | 55/139 X |
| 4,536,694 | 8/1985 | McCarty et al. | 320/2 |

*Primary Examiner*—Peter S. Wong

*Attorney, Agent, or Firm*—Harrington A. Lackey

[57] ABSTRACT

A power module for an electrostatic air cleaner in which an electronic power supply circuit and its components are enclosed within a relatively small modular housing having an AC voltage input in the form of plug-in blades particularly adapted to be inserted within a standard or conventional AC electrical outlet, and a cable for transmitting the high-voltage DC output from the housing to the air cleaner.

5 Claims, 8 Drawing Figures

Fig. 1
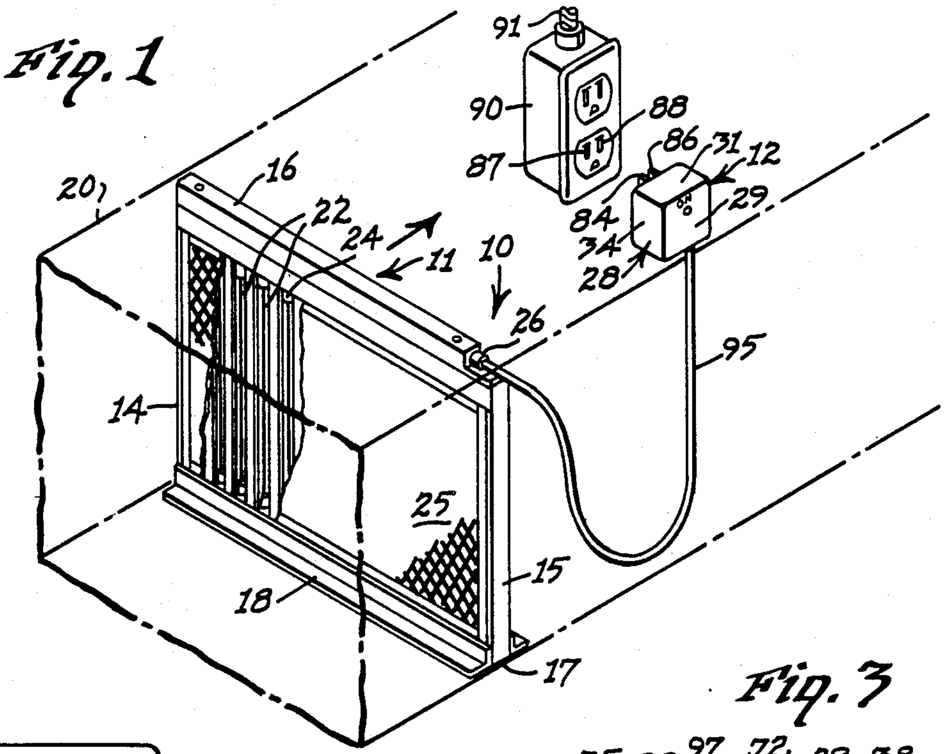
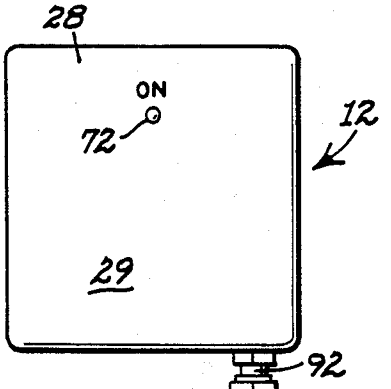
Fig. 2
Fig. 3
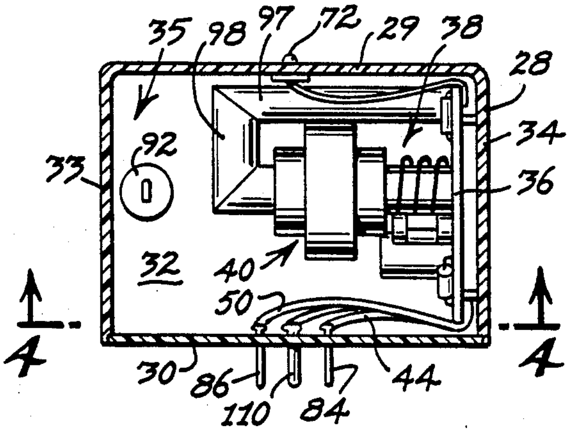
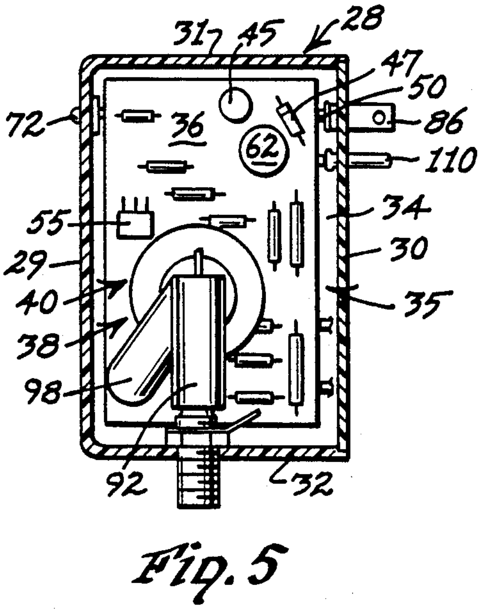
Fig. 5
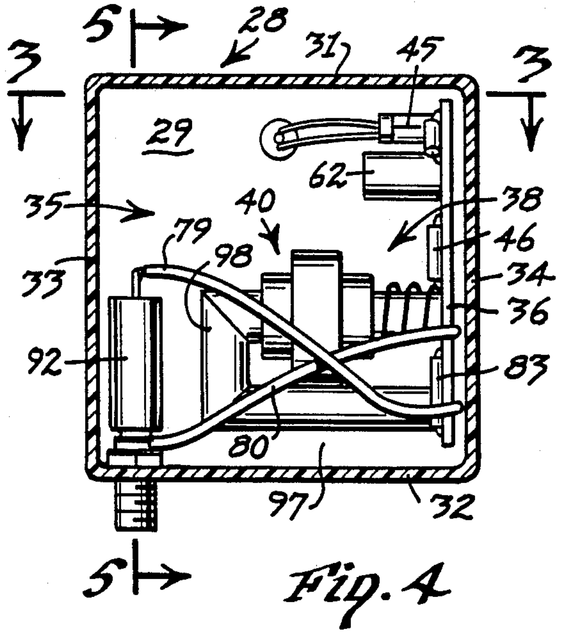
Fig. 4

PLUG-IN POWER MODULE FOR ELECTROSTATIC AIR CLEANER

BACKGROUND OF THE INVENTION

This invention relates to an electrostatic air cleaning device, and more particularly to a plug-in power module for an electrostatic air cleaner device.

Electrostatic precipitators of air cleaning devices are well known in the art. Such devices usually include 2 stages for treating the air, a first ionizing stage and a second collector stage. In the ionizing stage, the air moves past one or more ionizing wires from which are spaced grounded electrodes to provide an electrostatic field in which the particles in the air are ionized or electrically charged. The ionized particles then move through the second collector stage, which constitutes a plurality of alternately charged and grounded parallel collector plates creating electric fields. The ionized particles are attracted to one collector plate or the other, depending upon the charge on the particle. The air then leaves the second stage, minus the particles, in a cleaner and more purified state.

In the U.S. Pat. No. 4,007,024 for "PORTABLE ELECTROSTATIC AIR CLEANER" issued Feb. 8, 1977 to John P. Sallee, et al, and owned by the Assignee of the instant invention, the electrostatic air cleaner is made in the form of a relatively thin cell to permit the cell to be interchangeable with standard mechanical air filters positioned transversely in an air duct. The ionizing wires and the collector plates are arranged in substantially the same transverse plane, and the collector plates are disposed at an angle to the flow path in order to increase the effective flow path through the filter cell. Thus, with an electrostatic air cleaner cell as taught by the above Sallee et al patent, no separate installation operation is required. It is only required to withdraw the existing mechanical air filter transversely along its tracks from within the air duct, and to insert the thin electrostatic air cell along the same tracks to extend across the air passage within the duct.

The power supply for electrostatic air cleaners heretofore known, including the thin air cleaner disclosed in the Sallee et al U.S. Pat. No. 4,007,024, is in the form of a relatively large power pack including electrical circuitry and components, such as a relatively large transformer, a rectifier and an oscillator circuit. The function of the power pack is to convert standard household AC voltage, such as 110–120 VAC, into direct current voltage of substantially greater values, such as 5–7 kilovolts, sufficient to create the necessary electrostatic field around the ionizing wires to precipitate the solid particles carried by the air stream through the filter cell. Such power packs must be installed by qualified personnel, such as electricians. An output cable from the power pack is connected to the air filter cell, while a separate cable connected to the AC input circuit within the power pack must be wired into the electrical system within the building in which the air filter is installed.

Examples of such electrical power packs are disclosed in the following U.S. patents:

| | | |
|---|---|---|
| 1,992,974 | Thompson | Mar. 5, 1935 |
| 2,933,151 | Kurtz | Apr. 19, 1960 |
| 3,108,865 | Berly | Oct. 29, 1963 |
| 3,800,509 | Carr et al | Apr. 2, 1974 |

-continued

| | | |
|---|---|---|
| 4,007,024 | Sallee et al | Feb. 8, 1977 |

SUMMARY OF THE INVENTION

It is therefore an object of this invention to provide a power module for an electrostatic air cleaner, and particularly for an electrostatic air cleaner of the type disclosed in the above Sallee et al U.S. Pat. No. 4,007,024, in which the power module has a relatively small housing for containing solid-state components for the entire electronic power supply circuit, and in which the module housing is provided with plug-in type blades for in sertion into, and electrical communication with, a conventional or standard 110–120 AC volt electrical outlet.

The power module housing, including all of its electronic components, is small enough and light enough that it can be supported in its operative position in electrical communication with the standard power outlet solely by the plug-in blades projecting rigidly from the rear wall of the module housing into the standard electrical outlet.

The plug-in power module made in accordance with this invention permits the power module to be immediately connected to, and disconnected from, a standard AC electrical outlet, without any tools and without any specially qualified knowledge or personnel.

Thus, a plug-in power module made in accordance with this invention, when electrically connected to an electrostatic air filter such as that disclosed in the Sallee et al U.S. Pat. No. 4,007,024, permits complete and rapid installation of an electrostatic air filter within an existing air duct having slide tracks for normally receiving a conventional mechanical air filter and where there is a readily available standard 110–120 VAC electrical outlet in the vicinity of the duct. Thus, the ordinary homeowner is capable of completely installing his own electrostatic air filter quickly and without any tools or assistance. The existing mechanical air filter is withdrawn along its tracks from its transverse position within the existing air duct, the thin wall electrostatic air filter, as disclosed in the above Sallee et al patent, is slid into position to take the place of the mechanical air filter, and the plug-in module is plugged into an existing standard 110–120 VAC electrical outlet, to place the electrostatic air filter in its operative mode.

BRIEF DESCRIPTION OF THE DRAWINGS

FIG. 1 is a top front perspective view, with portions broken away, of a thin electrostatic air cleaner cell of the type disclosed in U.S. Pat. No. 4,007,024, installed in an air duct, disclosed in phantom, and incorporating the plug-in power module made in accordance with this invention, disclosed preparatory to insertion into a standard 110–120 VAC electrical outlet;

FIG. 2 is an enlarged, front elevational view of the plug-in power module;

FIG. 3 is a section taken along the line 3—3 of FIG. 4 of the plug-in power module disclosed in FIG. 2;

FIG. 4 is a section taken along the line 4—4 of FIG. 3;

FIG. 5 is a section taken along the line 5—5 of FIG. 4;

DESCRIPTION OF THE PREFERRED EMBODIMENT

Figure 7:
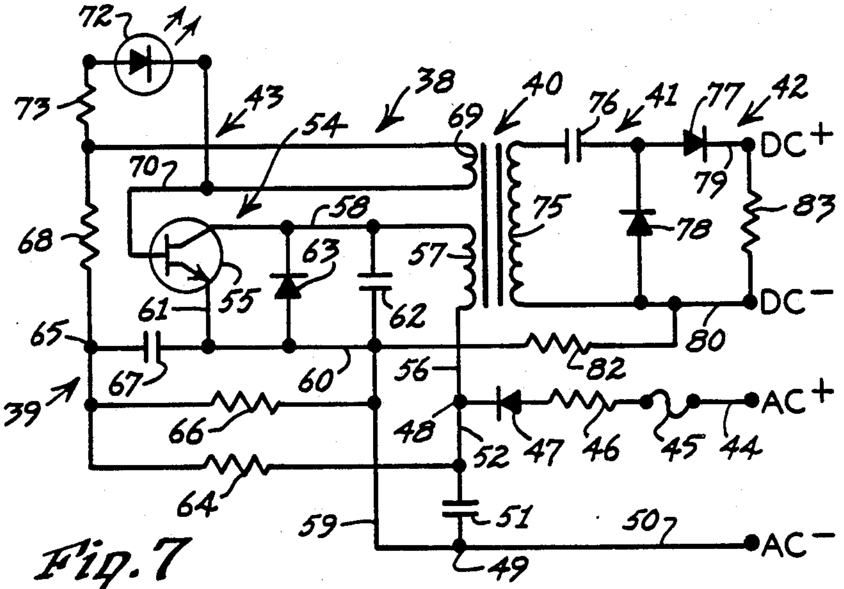
FIG. 7 is a schematic circuit diagram of the electronic power supply circuit incorporated in the plug-in power module disclosed in FIGS. 1–6.

Referring now to the drawings in more detail, FIG. 1 discloses an electrostatic air cleaning device 10 including an air cleaner unit or cell 11, preferably made in accordance with the teachings of U.S. Pat. No. 4,007,024, and a plug-in power module 12 made in accordance with this invention.

The air cleaner cell 11 comprises a rectangular frame including a pair of side frame members 14 and 15, a top frame member 16 and a bottom frame member 17. The frame members 14, 15, 16 and 17, are disposed in the same plane and have a uniform depthwise dimension in the air-flow direction of substantially less value than the longitudinal and widthwise dimensions of the cell 11.

As disclosed in FIG. 1, the depthwise dimension of the cell 11 is about 1 inch, and more specifically about 15/16 of an inch, so that the bottom frame member 17 and the top frame member 16 form parallel runners adapted to be slidably received within tracks, such as the bottom track 18, disposed transversely of the air conditioning duct 20.

Disposed within the cell 11 are a plurality of vertically extending transversely spaced ionizer wires 22. Between each pair of ionizer wires 22 is an angular collector plate 24. The ionizer wires 22 and the collector plates 24 are sandwiched between a pre-filter screen 25 and an after-filter screen, not shown, but disposed on the opposite side of the ionizer wires 14 and collector plates 24 from the pre-filter screen 25.

As disclosed in FIG. 1, at the right end of the top frame member or housing 16, is an electrical inlet connector 26 in electrical communication with positive and negative, or grounded, conductors, not shown, within the top frame member 16. The positive conductors lead to the ionizer wires 22 for applying high positive DC voltage to the ionizer wires 22, and the negative or grounded conductors lead from the inlet connector 26 to the collector plates 24, so that when the ionizer wires 22 are charged, highvoltage, electrostatic fields are created between the ionizer wires 22 and the respective collector plates 24.

The parts thus far disclosed are taught in the above U.S. Pat. No. 4,007,024, and thus, do not form any part of this invention per se.

The plug-in power module 12, made in accordance with this invention, includes a housing 28 substantially smaller than the cell 11, and having a front wall 29, a rear wall 30, a top wall 31, a bottom wall 32 and a pair of opposed side walls 33 and 34, enclosing a module space 35.

Received within the module space 35, in a fixed position spaced adjacent to the side wall 34 is a printed circuit board 36 upon which is supported most of the components of a high-voltage electronic power supply circuit 38.

As best disclosed in the schematic circuit diagram of FIG. 7, the high-voltage electronic power supply circuit 38 broadly includes an AC input circuit 39, a high-voltage step-up transformer 40, a rectifier circuit 41, a high-voltage DC output circuit 42, and an indicator lamp circuit 43.

More specifically, the AC input circuit 39 includes a positive AC input lead 44 connected in series with a fuse 45, a resistor 46, and diode 47 to junction 48. AC input junction 48 is separated from the AC negative input junction 49, and the negative or grounded AC input lead 50, by capacitor 51 in line 52.

The AC input circuit 39 includes oscillator circuit 54, having a transistor oscillator 55. The AC positive input junction 48 is connected through lead 56 to primary coil 57, the other side of which is connected into the oscillator circuit 54 through collector lead 58.

The AC negative junction 49 is connected by lead 59, to the common negative or grounded line 60. The emitter of the transistor 55 is connected through emitter lead 61 to common line 60.

Capacitor 62 and diode 63 are connected in parallel with the collector-emitter circuit of the transistor 55 across the collector lead 58 and the common line 60.

Line 52 is connected through resistor 64 to junction 65 in the common line 60, while line 59 is connected through resistor 66 to the junction 65.

Common line 60 includes capacitor 67 between the junction 65 and the emitter lead 61. Junction 65 is connected through resistor 68 and indicator lamp coil 69 to the base lead 70 of transistor 55. The indicator lamp in the form of LED 72 is connected to lamp coil 69 through resistor 73.

The secondary coil 75 of the transformer 40 is connected in series with capacitor 76 and diode 77 in the rectifier circuit 41, and with the D.C. positive output lead 79 and the DC negative output lead 80 in output circuit 42. Diode 78 is connected across leads 79 and 80 between capacitor 76 and diode 77. The DC negative lead 80 is connected to the common line 60 through resistor 82. The output leads 79 and 80 are bridged by the bleed resistor 83.

Corresponding solid-state components disclosed in the circuit diagram of FIG. 7, are also found mounted on the printed circuit board 36 in FIGS. 3–6.

The AC inlet leads 44 and 50 are each connected to a corresponding plug-in blade 84 and 86 mounted in fixed, spaced apart relationship upon the rear wall 30 of the housing 28. Each of the blades 84 and 86 is fixed directly and rigidly to the rear wall 30 in such a manner that they will register with the corresponding outlet holes 87 and 88 of a standard electrical outlet 90 of conventional construction, such as a 110–120 VAC outlet found in most households and buildings, as best disclosed in FIG. 1. The standard outlet 90 is connected to a conventional source of AC power through the conduit 91.

Thus, the size of the housing 28 as well as the size and weight of each of the solid-state electrical components in the electronic circuit 38, as well as the weight and size of the printed circuit board 36, are such that when the blades 84 and 86 are fully inserted within the corresponding outlet holes 87 and 88 in the standard outlet 90, the module 12 is solely supported by the blades 84 and 86, without any additional attachments or connections.

The high-voltage output leads 79 and 80 are connected through the outlet connector 92 to one end of a high-voltage electrical cable 95, the opposite end of which is connected to the inlet connector 26 of the filter cell 11. The cable 95 may be coaxial, but in any event, carries both the high-voltage positive line from the outlet lead 79, as well as the negative or ground conductor line connected to the ground or negative lead 80.

The transformer 40 is mounted on the circuit board 36 and to the bottom wall 32 by support 97 fixed to the transformer core 98.

The module space may be filled with potting resin, not shown, to insulate the electronic components from each other and to rigidly hold the parts in place, if desired.

Figure 8:
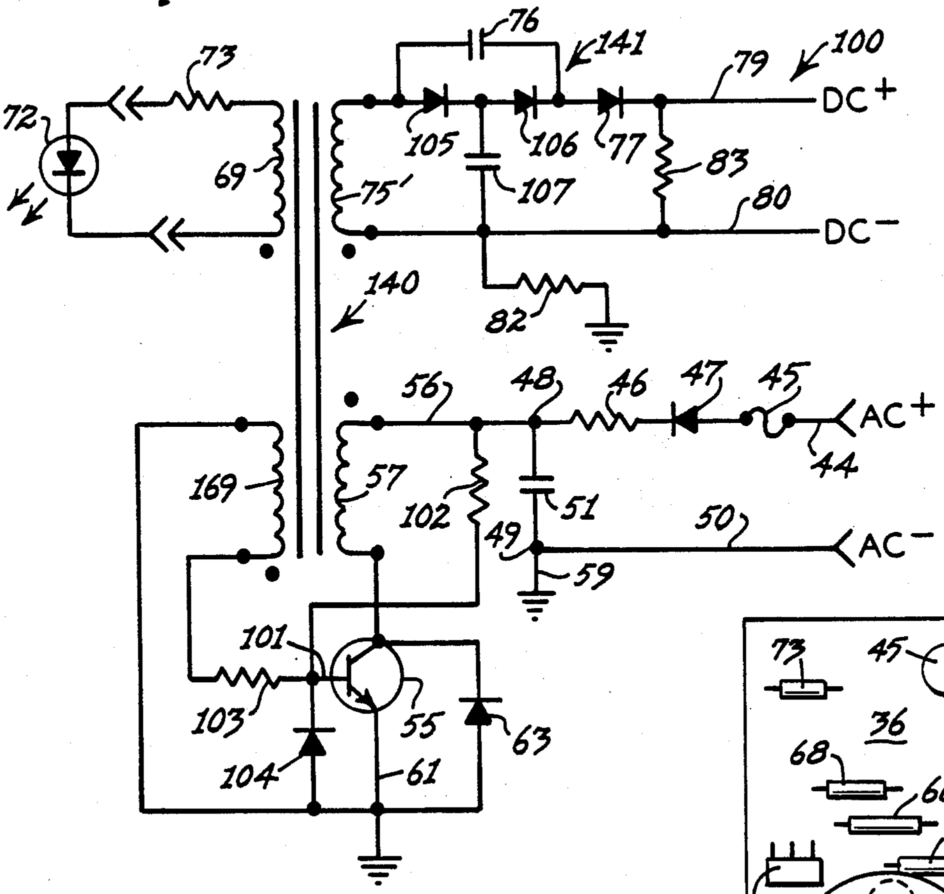
FIG. 8 is a schematic diagram of a modified electronic power supply circuit adapted to be incorporated in the plug-in power module made in accordance with this invention.
Figure 6:
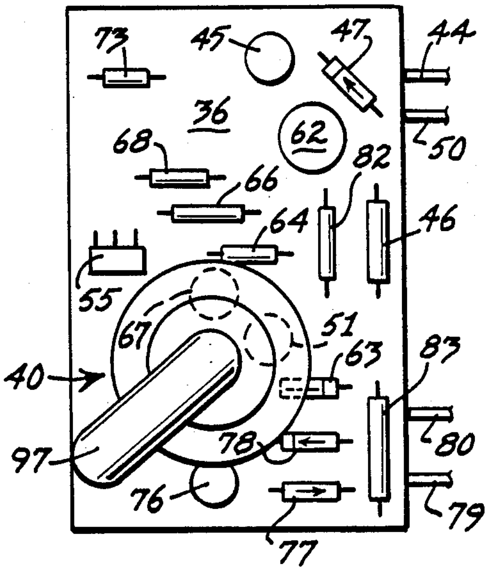
FIG. 6 is an enlarged plan view of the printed circuit board incorporated in plug-in power module made in accordance with this invention.

FIG. 8 discloses a slightly modified electronic power supply circuit 100, which might be substituted for the electronic supply circuit 38, and includes many of the corresponding solid-state components mounted upon the printed circuit board 36 in a slightly different arrangement.

Like components in circuit 100, which also are included in circuit 38, are indicated by identical reference numerals.

Positive input junction 48 is connected to base lead 101 of transistor 55 through resistor 102. The transformer 140 includes the primary coil 57 and secondary coil 75', as well as lamp coil 69, and coil 169 connected across the emitter-base circuit of the transistor 55 through resistor 103.

A diode 104 is also connected across the base-emitter circuit of the transistor 55, in parallel with the coil 169.

The rectifier circuit 141 in the supply circuit 100, is modified from the rectifier circuit 41 in that the capacitor 76 is connected in parallel across a pair of diodes 105 and 106 connected in series with diode 77. Capacitor 107 is connected in parallel with the coil 75' and diode 105.

The values of the various components in each of the supply circuits 38 and 100 are such that a very high output DC voltage is produced across the leads 79 and 80, in the range of 5–7 kilovolts, when the plug-in power module 12 is in operative position with the blades 84 and 86 inserted within the outlet holes 87 and 88 of AC outlet 90. This high output DC voltage is then applied across the ionizer wires 22 and collector plates 24.

It will be noted that the blades 84 and 86 project from the rear wall 30 of the housing 28, while the indicator lamp 72 is mounted on the opposite front wall 29 where it is clearly visible to indicate the operativeness of the module 12. The outlet connector 92 is mounted in the bottom wall 32 of the housing 28 so that cable 95 can depend freely from the bottom of the module 12 and minimize any strain upon the cable connector 92, when the module 12 is in its plugged-in operative position.

It will thus be apparent that an electrostatic air filter device 10, including both the slip-in filter cell 11 and the plug-in power module 12, can easily be installed in an existing air duct of most homes or buildings incorporating standard air ducts for heating, ventilating or air conditioning systems. Moreover, the electrostatic air filter device 10 can be installed without any tools and without the need for any outside assistance or any special training. All that is needed for the installation of such a unit is to have a conventional air duct 20 with existing transverse tracks 18 and a standard AC electrical outlet 90 in the general vicinity of the location of the filter cell 11.

The ends of the cable 95 may be permanently connected to either or both the filter cell 11 and the plug-in module 12, or either end may be threadedly connected to the respective inlet 26 and connector 92, or the ends of the cable 95 may be provided with conventional cooperating electrical jacks and sockets.

The plug-in module 12 may also be provided with a standard ground prong 110, if desired.

What is claimed is:

1. A plug-in power module for an electrostratic air cleaner having spaced ionizer wires and collector plates and electrical inlet means for receiving high-voltage electrical energy to create electrostatic fields between the ionizer wire and the collector plates, comprising:

(a) a module housing substantially smaller in size than the electrostatic air cleaner to which said module housing is connected, and having a plurality of walls enclosing a module space, including a front wall and a rear wall, (b) a high-voltage electronic power supply circuit including solid-state components comprising an AC input circuit, a step-up transformer, a rectifier circuit, and a DC output circuit, all contained within said module space, (c) a printed circuit board within said module space and spaced closely adjacent one of said walls, said solid-state components being mounted upon said printed circuit board and electrically connected to each other, (d) said AC input circuit being connected to the primary of said transformer, the secondary of said transformer being connected to said rectifier circuit, and said rectifier circuit terminating in said DC output circuit, (e) said solid-state components being sized to produce in said DC output circuit a DC output voltage of 5–7 kilovolts when said AC input cirucit receives an AC input signal from the standard AC electrical outlet of 110–120 volts, (f) plug-in blades mounted in said rear wall and in electrical communication with said AC input circuit, said blades projecting rearwardly outward from said rear wall and spaced apart to be inserted into a standard AC electrical outlet and in electrical communication with an AC electrical power source, in operative position, (g) a high-voltage DC electrical output connector extending through one of said housing walls other than said rear wall and said wall closely adjacent said printed circuit board, and in electrical communication with said DC output circuit, (h) an electrical high-voltage cable having opposite ends, one end being in electrical communication with said output connector, and the other end being connected in electrical communication with the electrical inlet means of the electrostatic air cleaner, (i) the size and weight of said module housing and said contained electronic components being small enough that said housing is supported in said operative position solely by said plug-in blades inserted into the AC electrical outlet.

2. The invention according to claim 1 in which said AC input circuit comprises a solid-state oscillator.

3. The invention according to claim 1 further comprising an indicator lamp mounted on said front wall and in electrical communication with said AC input circuit, said indicator lamp being illuminated when said electronic power supply circuit is operative.

4. The invention according to claim 1 in which one of said walls is a bottom wall, said DC electrical output connector extending through said bottom wall.

5. The invention according to claim 4 in which one of said walls is a side wall, said printed circuit board being mounted adjacent and closely spaced to said side wall, so that all said solid-state components project into said module space on the opposite side of said printed circuit board from said side wall.

* * * * *